Oct. 1, 1963     M. C. BOESCH     3,105,587
DISTRIBUTING AND CONVEYING SYSTEM
Filed Oct. 24, 1960     9 Sheets-Sheet 2
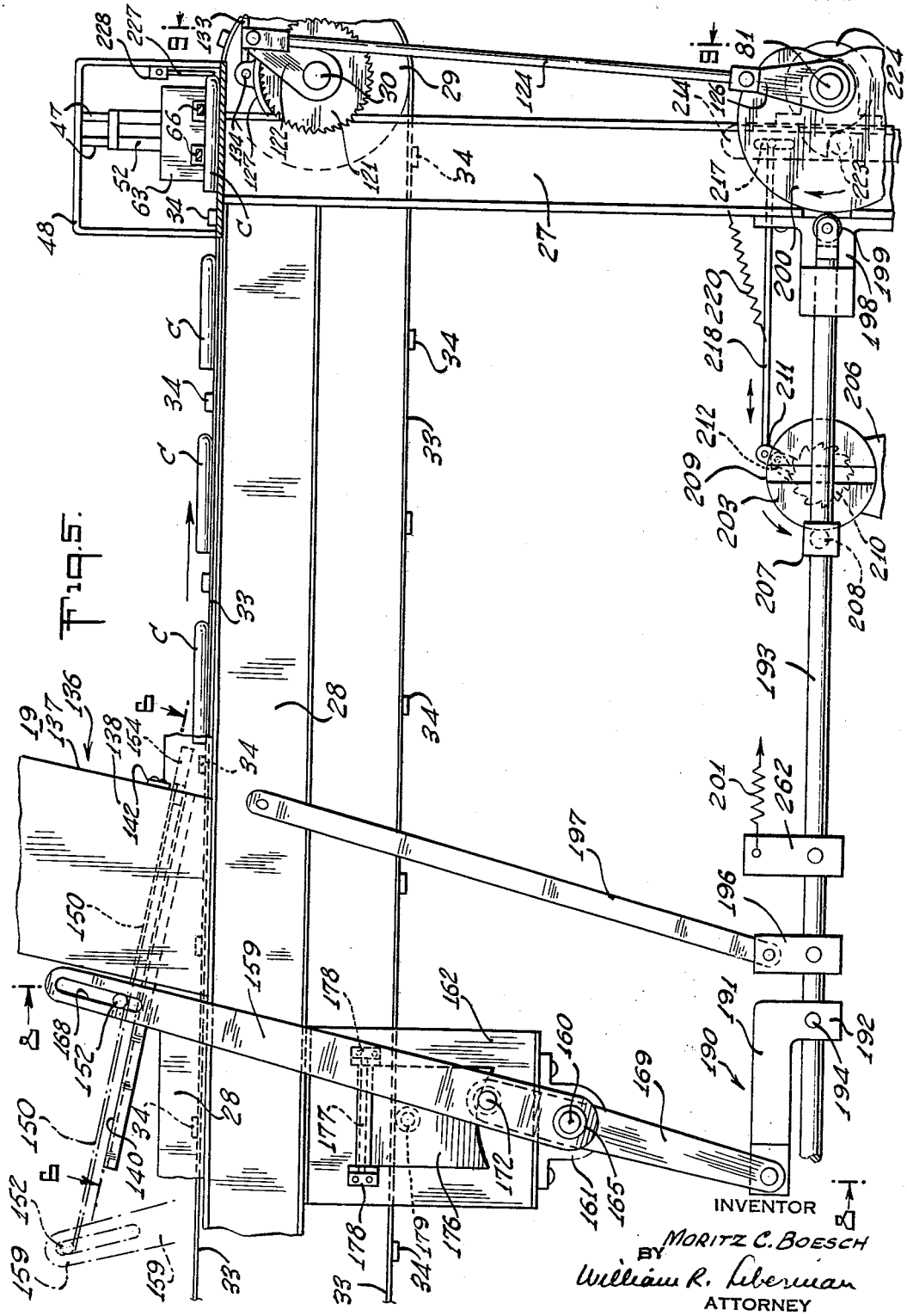
INVENTOR
MORITZ C. BOESCH
BY William R. Lieberman
ATTORNEY

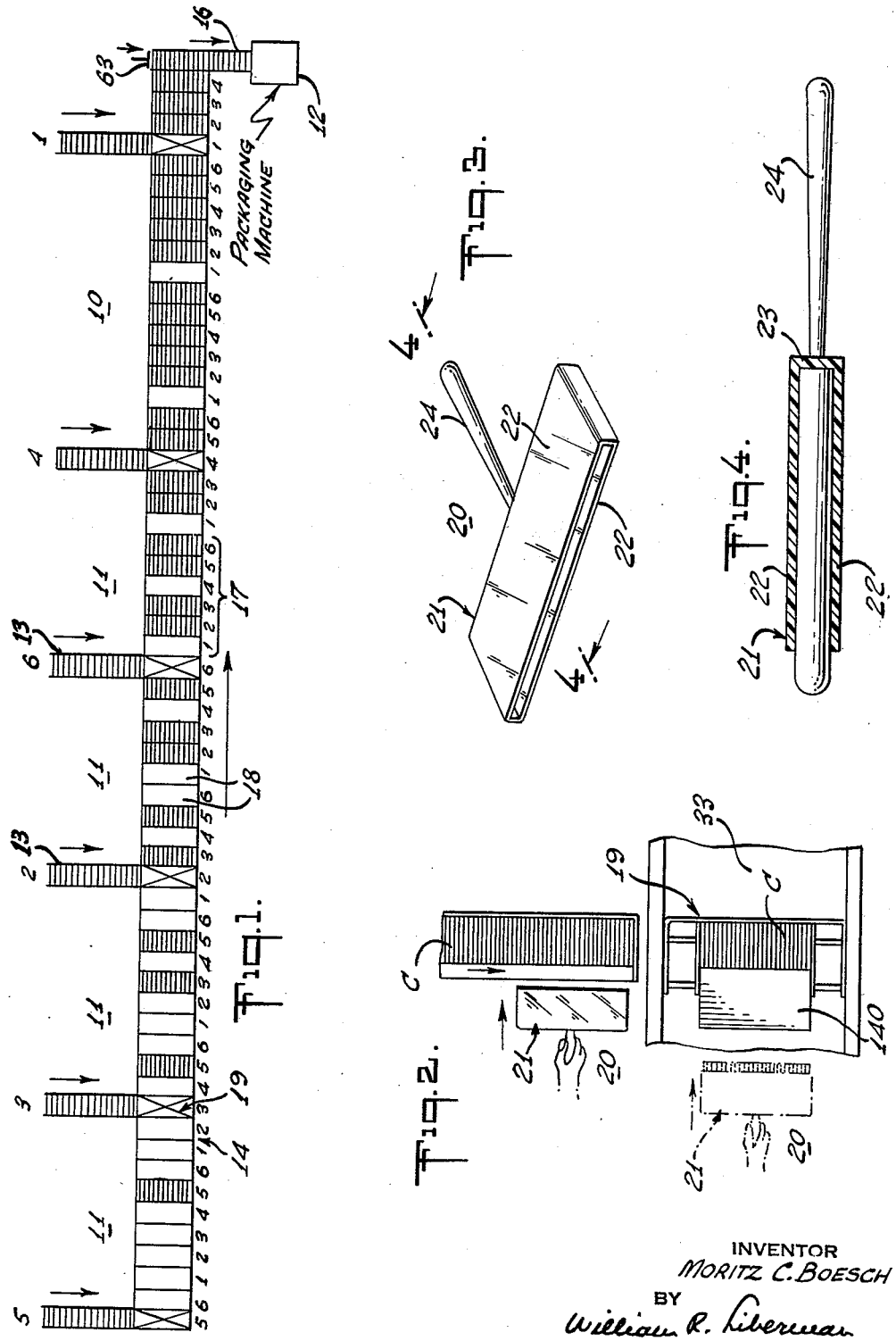

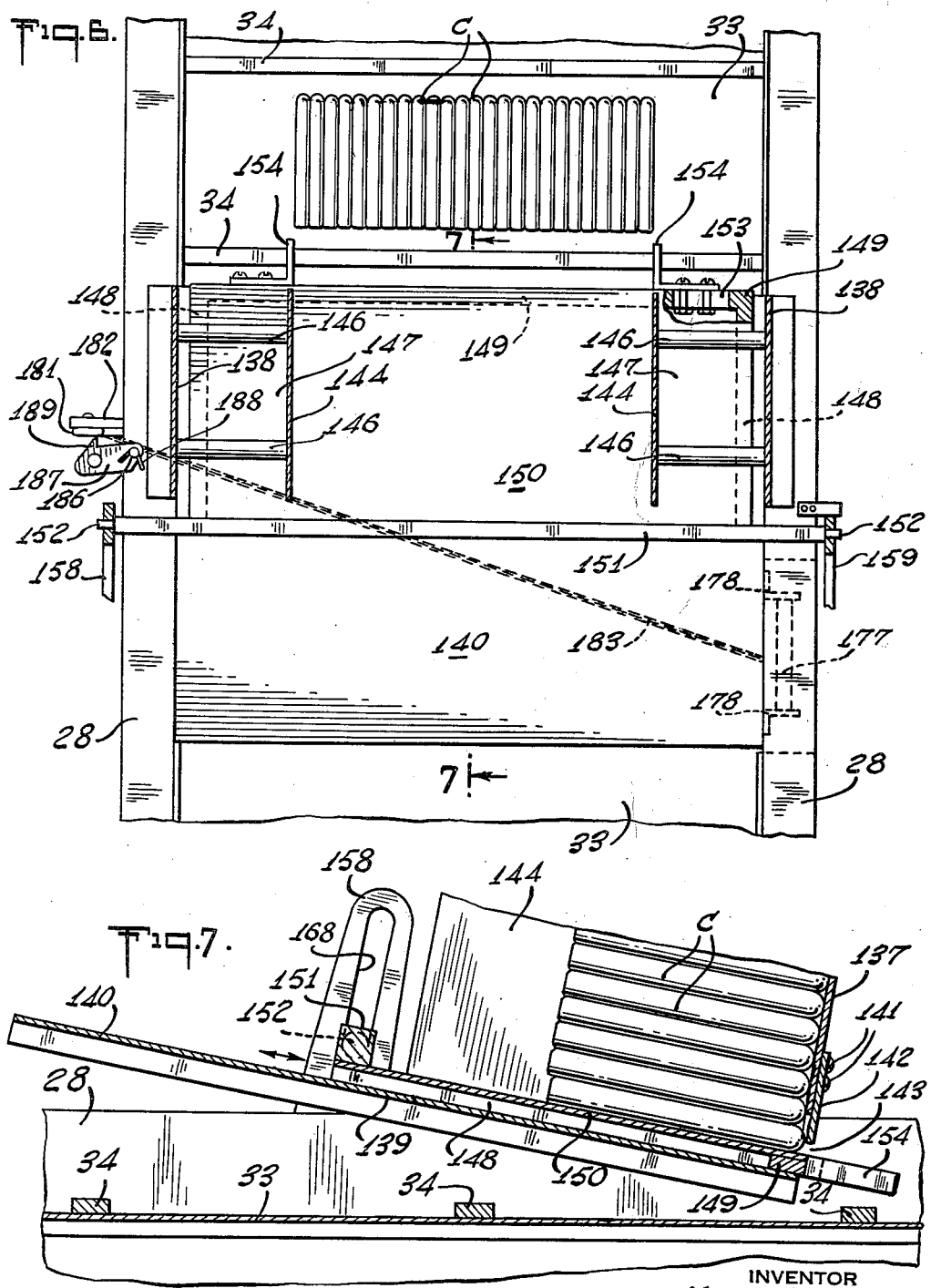

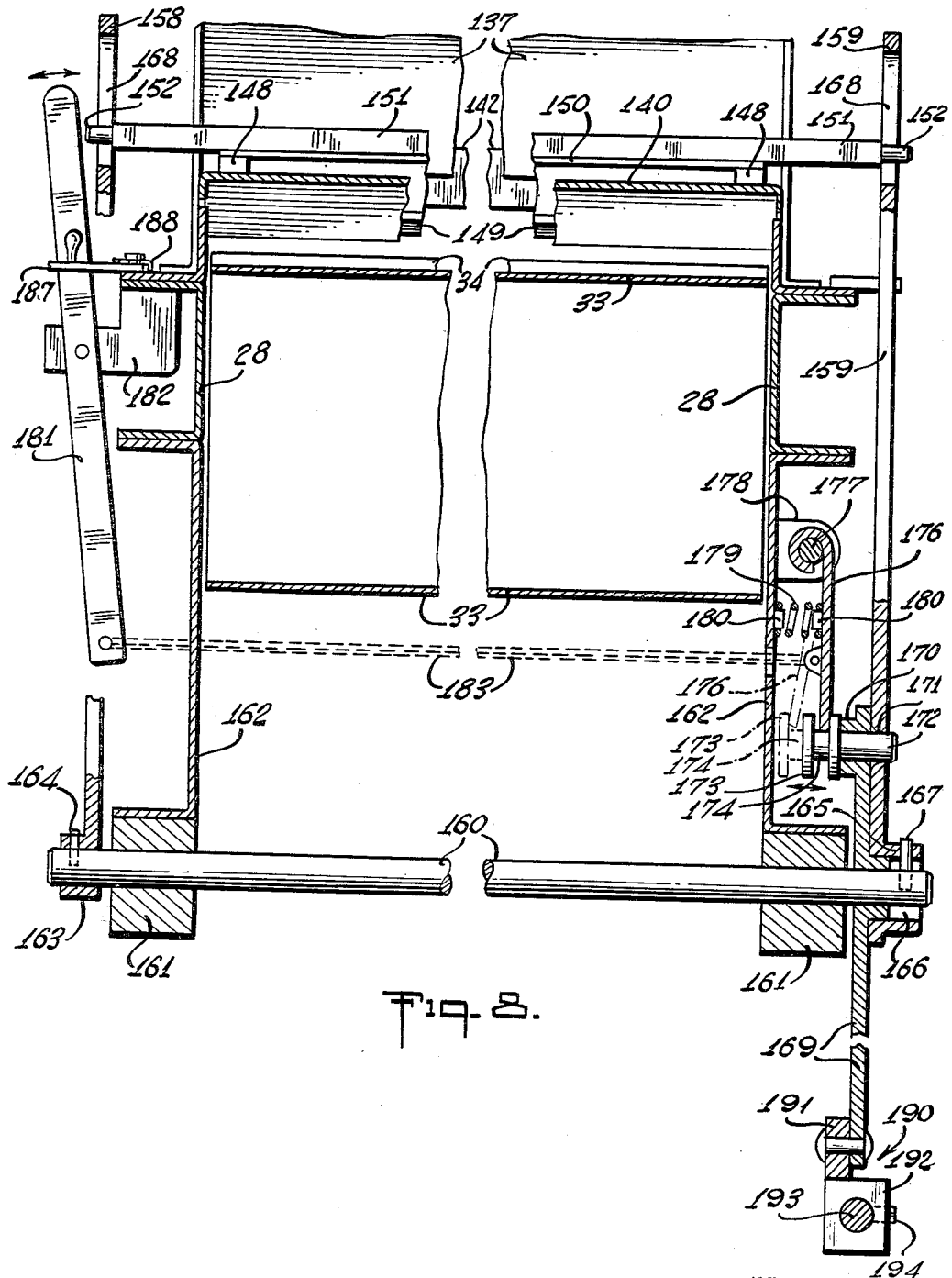

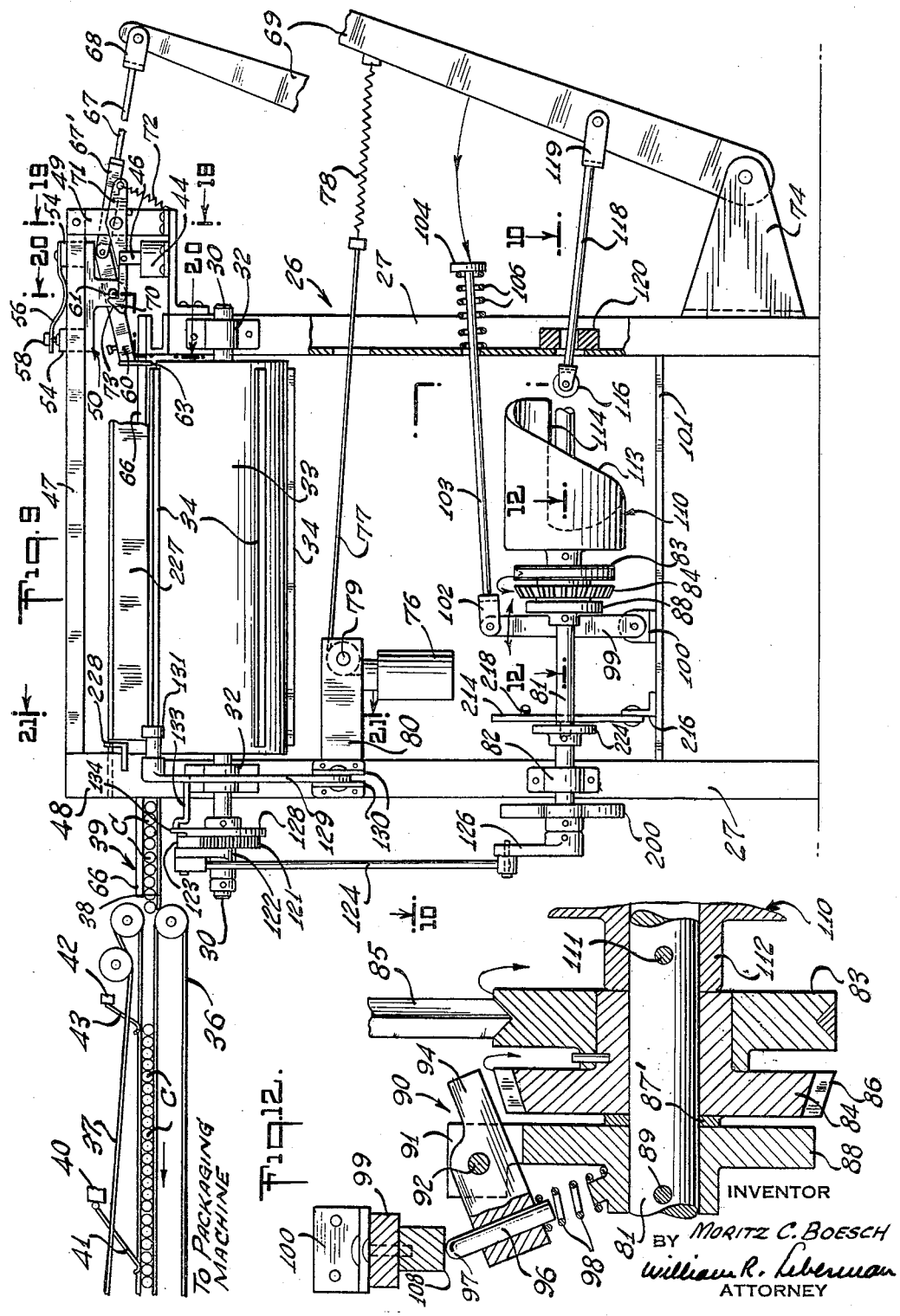

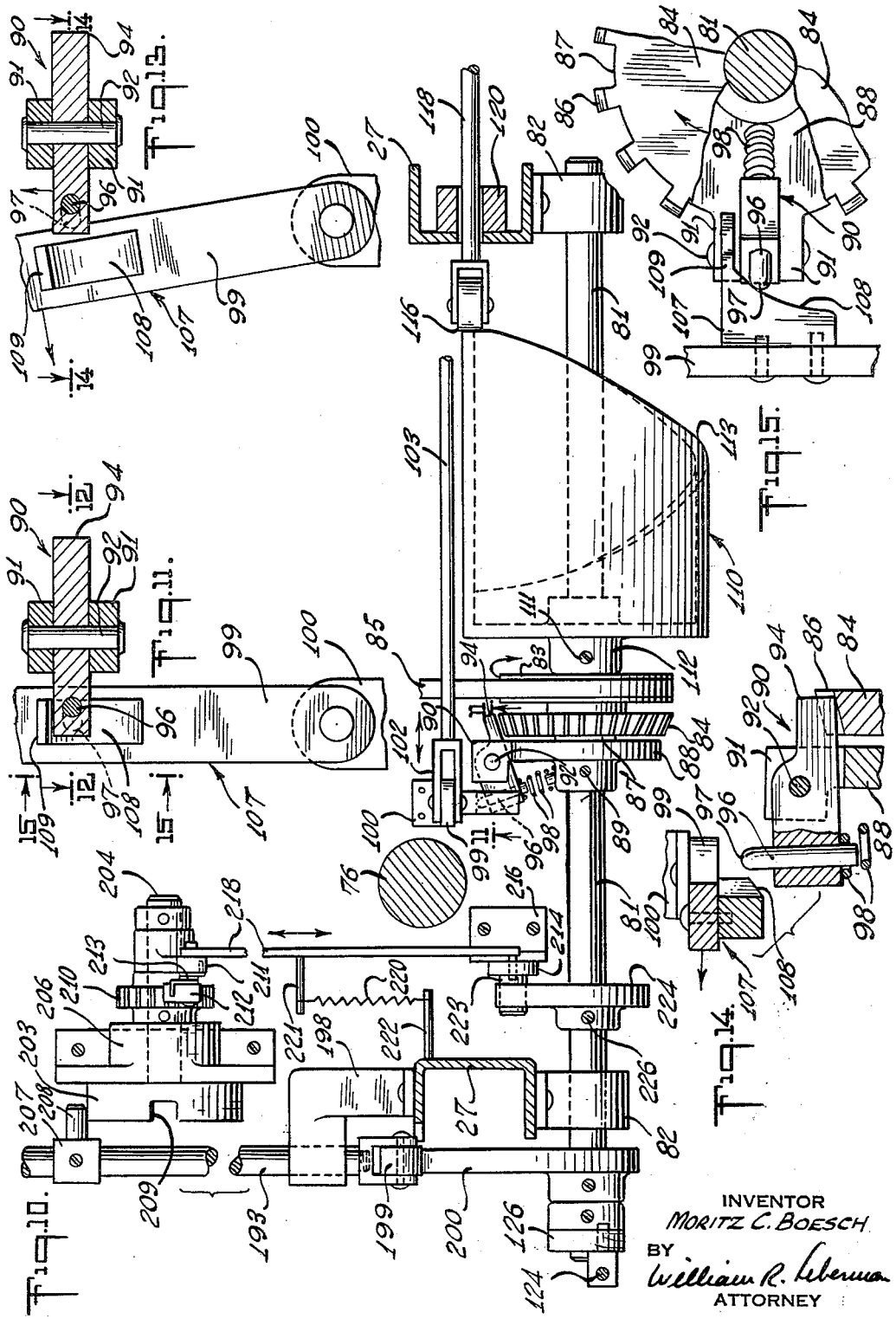

Oct. 1, 1963 M. C. BOESCH 3,105,587
DISTRIBUTING AND CONVEYING SYSTEM
Filed Oct. 24, 1960 9 Sheets-Sheet 7
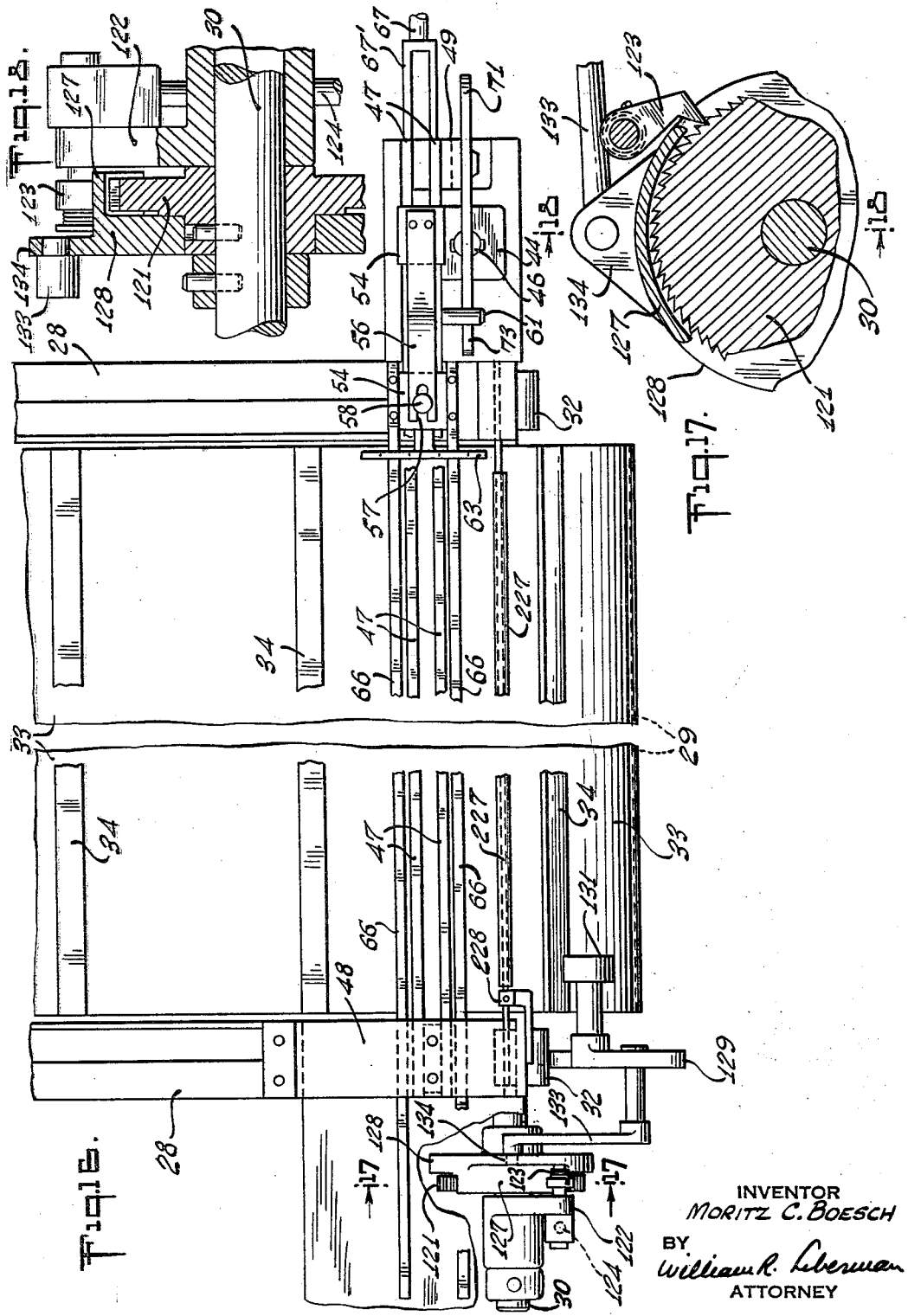
INVENTOR
MORITZ C. BOESCH
BY
William R. Lieberman
ATTORNEY

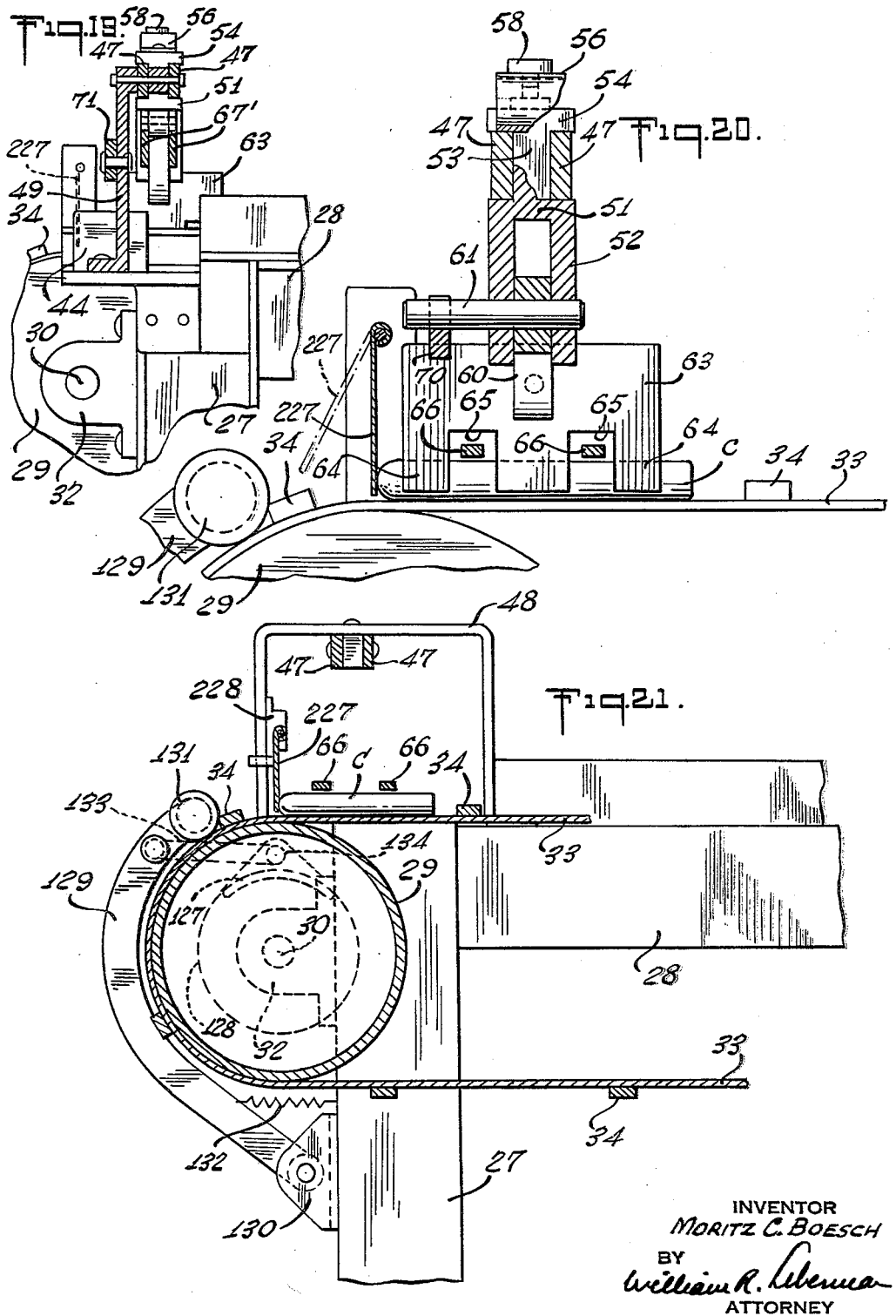

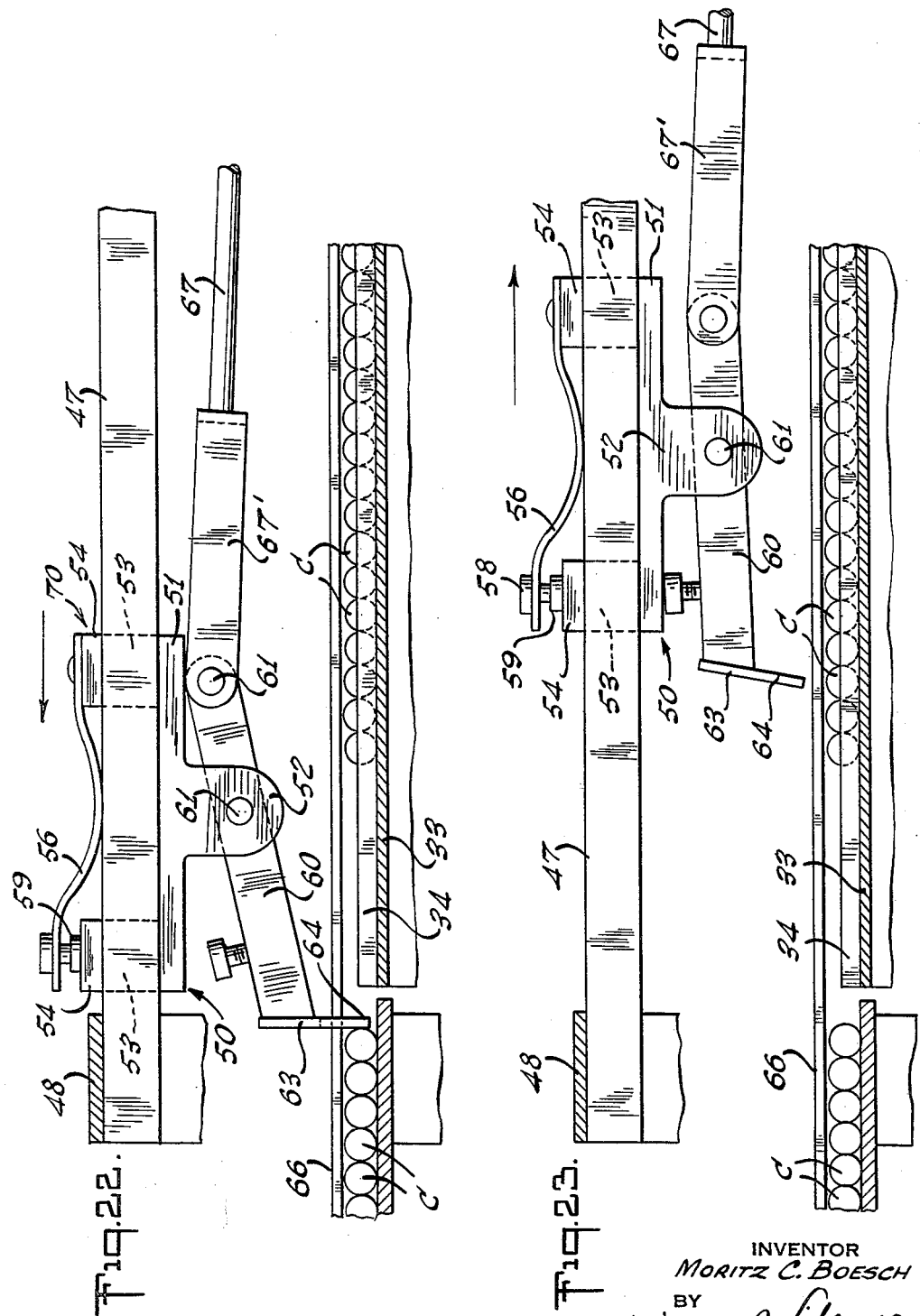

United States Patent Office 3,105,587
Patented Oct. 1, 1963

3,105,587
DISTRIBUTING AND CONVEYING SYSTEM
Moritz C. Boesch, Poughkeepsie, N.Y., assignor to Consolidated Cigar Corporation, New York, N.Y., a corporation of Delaware
Filed Oct. 24, 1960, Ser. No. 64,332
4 Claims. (Cl. 198—79)

The present invention relates generally to improvements in conveying and distributing systems, and it relates particularly to an improved system for receiving articles from a plurality of first handling or treating devices at a plurality of inspection stations and then conveying the articles from the inspection stations to a common means for handling the articles thereafter.

In the packaging of many articles, as typified by cigars, the cigars are first banded and then individually wrapped in cellophane, or other transparent material. The cigars are then inspected and loaded into trays and trucks. Thereafter, they are transported to another location where they are hand-fed into a high speed machine and by it packaged in predetermined numbers. The above procedure, which is conventional, is highly time and labor consuming, and is thus expensive. Moreover, the space requirements as well as the truck and tray requirements are considerable. There are numerous other drawbacks and disadvantages and the conventional practice otherwise leaves much to be desired.

It is thus a principal object of the present invention to provide an improved article conveying and distributing system.

Another object of the present invention is to provide an improved apparatus for conveying articles from a plurality of inspection stations to a common article handling machine.

Still another object of the present invention is to provide an improved conveying system which transports articles from a plurality of spaced feed devices to a packaging machine in accordance with the requirements of the packaging machine.

A further object of the present invention is to provide an improved conveyor provided with means for advancing the conveyor predetermined increments and automatically regulating the length of such increments.

Still a further object of the present invention is to provide an improved conveyor for feeding a packaging machine, which conveyor is provided with means for transferring articles from said conveyor in accordance with the requirements of the packaging machine.

A further object of the present invention is to provide a conveying system of the above nature characterized by its ruggedness, simplicity and efficiency of operation.

The above and other objects of the present invention will become apparent from a reading of the following description, taken in conjunction with the accompanying drawings, which illustrate a machine embodying the present invention, wherein FIGURE 1 is a diagrammatic plan view of the improved conveying and distributing system according to the present invention;

FIGURE 2 is a plan view of an inspection station, the operator being shown in full line in the act of withdrawing a group of articles for inspection and in broken line depositing the inspected group of articles, such as cigars, in a feed hopper;

FIGURE 3 is a perspective view of an inspection scoop;

FIGURE 4 is a sectional view taken along line 4—4 in FIGURE 3;

FIGURE 5 is a side elevational view of the leading drive end of the main conveyor, illustrated partially broken away and partially in section, the hopper discharge member being shown by broken line in a retracted position;

FIGURE 6 is a sectional view taken along line 6—6 in FIGURE 5;

FIGURE 7 is a sectional view taken along line 7—7 in FIGURE 6;

FIGURE 8 is a sectional view taken along line 8—8 in FIGURE 5;

FIGURE 9 is a sectional view taken along line 9—9 in FIGURE 5;

FIGURE 10 is a sectional view taken along line 10—10 in FIGURE 9;

FIGURE 11 is a sectional view taken along line 11—11 in FIGURE 10;

FIGURE 12 is a sectional view taken along line 12—12 in FIGURE 11;

FIGURE 13 is a view similar to FIGURE 12, the coupling element being illustrated in released clutch engage position;

FIGURE 14 is a sectional view taken along line 14—14 in FIGURE 13;

FIGURE 15 is a sectional view taken along line 15—15 in FIGURE 11;

FIGURE 16 is a top plan of the leading drive end of the main conveyor shown partially broken away;

FIGURE 17 is a sectional view taken along line 17—17 in FIGURE 16;

FIGURE 18 is a sectional view taken along line 18—18 in FIGURE 17;

FIGURE 19 is a sectional view taken along line 19—19 in FIGURE 9;

FIGURE 20 is a sectional view taken along line 20—20 in FIGURE 9;

FIGURE 21 is a sectional view taken along line 21—21 in FIGURE 9;

FIGURE 22 is an enlarged detailed front elevational view illustrating the transfer mechanism in movement toward its advanced position and shown partially broken away and partially in section; and FIGURE 23 is a view similar to FIGURE 22, the transfer member being illustrated moving toward its retracted position.

In a sense, the present invention contemplates the provision of an improved conveying system comprising a main endless conveyor including a plurality of successive longitudinally extending groups, each of said groups being longitudinally subdivided into a predetermined number of substantially equal increments, means intermittently advancing said conveyor an increment thereof, a plurality longitudinally spaced and transversely extending article delivery means disposed along said conveyor, the spacing between successive delivery means being a multiple of said increments different than the number of increments in said group and registering with different increments in said respective groups, and means intermittently concurrently actuating said article delivery means upon advance of said conveyor a group of increments.

Another important feature of the present invention resides in the construction of the main conveyor, which is in the form of an endless belt carrying regularly longitudinally spaced index members and includes means for intermittently advancing the conveyor an increment the length of which is predetermined by the position of the index members.

A further feature of the present apparatus is the provision of a discharge conveyor adjoining the main conveyor and having an article sensing device, means being provided which are actuated by the article sensing device to effect the transfer of articles from the main conveyor to the discharge conveyor and to advance the main conveyor an increment thereof.

According to a preferred form of the present invention, the improved machine is employed in conveying such articles as cigars from a plurality of inspection stations which are fed from cigar wrapping machines to a high speed packaging machine. The main conveyor is in the form of an endless belt extending between a pair of drums and subdivided into regularly spaced increments by transverse flights. The delivery devices are located along the top of the main conveyor and each includes an inclined rectangular hopper, open at its rear and provided with a discharge opening at the bottom of its front wall. A discharge member is slidable along the base of the hopper and slightly less in height than the cigar thickness so that a reciprocation of the discharge member deposits a layer of cigars in a registering conveyor section. An auxiliary conveyor extends transversely from the leading side edge of the main conveyor and is provided with an article sensing switch, and a slidable transfer member is movable across the face of the main conveyor in alignment with the auxiliary conveyor. The apparatus drive includes a continuously motor-driven element and a single revolution coupling mechanism affixed to a drive shaft. The transfer member is spring-actuated in response to the sensing switch and, in turn, actuates the coupling member which effects the retraction of the transfer member, the increment advance of main conveyor and the advance of an index member which permits the actuation of the discharge members following the advance of the main conveyor a predetermined number of increments.

Referring now to the drawings which illustrate a preferred embodiment of the present invention, and more particularly to FIGURES 1 to 4 thereof, the reference numeral 10 generally designates the improved conveying and distributing system as applied to the transportation of cigars from a plurality of longitudinally spaced inspection stations 11 to a high speed packaging machine 12. Associated with each of inspection stations 11 is a transversely extending conveyor or feed device 13 to which is fed individually wrapped cigars from any conventional wrapping machine.

In the present example, packaging machine 12 has a speed of approximately six times that of the individual wrapping machines and, as a consequence, six inspection stations 11 are provided, as shown in FIGURE 1. A main conveyor 14 transports the cigars from the inspection stations 11 to a terminating transverse conveyor 16, which extends from the discharge end of main conveyor 14 to packaging machine 12. Main conveyor 14 is divided along its length into a plurality of successive groups 17, each group 17 being, in turn, subdivided into an equal number of increments or subdivisions 18, for example, six, these being numbered successively from 1 to 6.

An article or cigar feed device 19 is associated with each inspection station 11, and is disposed above main conveyor 14. The spacing between successive feed devices 19 is such that they at all times concurrently register with different respective increments or subdivisions 18 in the corresponding groups 17. The separation between the successive feeding device 19 may be equal, for example, five or seven increments, or, as illustrated, may be different, the separation between the successive feed devices 19 in the present embodiment being 10, 11, 10, 10 and 15 increments respectively (from left to right in FIGURE 1). As will be hereinafter described, main conveyor 14 is intermittently advanced a single increment upon the packaging machine requiring cigars, and the feed devices 19 are actuated to deposit a layer of cigars onto the registering conveyor subdivisions each advance of the main conveyor 14 a group of increments, to wit, six. As can be seen from FIGURE 1, each of the subdivisions successively receive a layer of cigars so that they are all filled upon reaching the discharge end of the main conveyor 14 at the packaging machine 12, where they are transferred to the packaging machine in the manner hereinafter set forth.

An inspector is present at each of stations 11 to inspect the cigars carried thereto by conveyors 13, and to transfer them to the feeding devices 19 attendant to the inspection of the cigars. In order to expedite this procedure, the operator employs a scoop type transfer member 20, which includes a tray 21 formed of any suitable transparent material and including upper and lower walls 22, 22, a rear wall 23 and end walls. The front of tray 22 is open and the width thereof is such as to engage a number of cigars convenient for inspection and somewhat less than the width of the main conveyor 14 and is of a depth somewhat less than the length of the cigar. A medially located handle 24 extends rearwardly from the tray back wall 23. In employing the transfer scoop 20, the operator merely slides it toward the leading ends of the cigars along the conveyor 13 to engage and raise therewith a measured number of cigars. The operator visually inspects the wrapped cigars through the transparent walls 22, manually removing any cigars which may be defective, and then discharges the cigars from the scoop 20 as a single layer into the feed device 19 (see FIGURE 2).

As best seen in FIGURES 5 through 9 of the drawings, main conveyor 14 is supported on a framework 26 formed of structural members and including a plurality of longitudinally spaced pairs of transversely spaced vertical legs 27 which may be reinforced and braced in any suitable manner and are connected along their upper outer faces by longitudinally extending structural channel members 28. Rotatably mounted on the upper portions of the leading and trailing pairs of frame legs 27 are drums 29. The leading drum 29 is affixed to a shaft 30 journalled to legs 27 by means of pillow blocks 32. And endless flexible belt 33 is supported by and between and about the leading and trailing drums 29. Extending transversely across the outer face of belt 38 are a plurality of regularly spaced raised flights or pusher blades 34, the spacing between successive flights defining an increment or subdivision 18 of main conveyor 14.

Packaging machine 12 includes an endless conveyor belt 36 extending laterally from a point spaced from the leading side edge of main conveyor belt 33 and an upper endless belt 37, belts 36 and 37 having vertically spaced parallel advancing runs between which the cigars are engaged and transported. The belts 36 and 37 are driven in the usual manner by the packaging machine. Extending rearwardly from the trailing end of belt 36, at a level with its upper advancing run, is a platform 38 which is coplanar with the upper run of the main belt 33 and there are provided guide rods 39 which are parallel to and extend across and are spaced above platform 38 and belt 33. A micro-switch 40 is provided with an actuating rod 41 which is located in the path of cigars C transported by belts 36 and 37, switch 40 being connected to packaging machine 12 thereby to deactivate the machine when the arm 41 senses the absence of cigars C. A second microswitch 42 is provided with an actuating sensing arm 43 located in the path of cigars C at a point rearwardly of arm 41. Actuating switch 42 is connected through a solenoid 44 to a source of current thereby to energize solenoid 44 upon the absence of cigars C in registry with sensing arm 43, and activate and withdraw solenoid armature 46 to initiate a cycle of operation of the conveying system.

The first operation in the machine cycle is the transfer of cigars from the leading increment on belt 33 by way of platform 38 to belt 36. This is effected by a transfer mechanism, shown in FIGURES 9, 16 and 19 through 23 of the drawings, which includes a pair of parallel longitudinally spaced transversely extending tracks 47 located above the upper run of conveyor 33 and supported by forward and rear upright brackets 48 and 49 respectively. A carriage 50 is slidable along tracks 47 and includes a longitudinally extending bottom plate 51 underlying tracks 47 and provided with a centrally located depending yoke 52 and a pair of longitudinally spaced upright blocks 53 slidably sandwiched between the confronting faces of tracks 47, and terminating in cross-pieces 54 engaging the upper surfaces of tracks 47. A downwardly convex leaf spring 56 has one end thereof secured to trailing cross-piece 54 and is provided at its leading end with a notch 57 which engages the shank of a headed screw 58. The screw 58 mates with a corresponding tapped bore centrally formed in forward cross-piece 54 and carries a lock nut 59 so that the pressure of the underface of the leaf spring 56 on the upper surface of tracks 57 may be adjusted by means of said screw 58.

A lever 60 is rockably supported intermediate its ends between the arms of yoke 52 by a pin 61 registering with aligned openings formed in the yoke arms and lever 60. Depending from the leading face of lever 60 is a forked pusher plate 63 which includes depending tines 64 spaced apart by slots 65 which tines register with a pair of longitudinally spaced transversely extending parallel guide bars 66 disposed above the level of the top run of belt 33. The trailing end of lever 60 is pin-connected to a yoke 67' which is coupled by way of a rod 67 and a yoke 68 to the upper free end of a rockable actuating arm 69. The carriage-carried pin 61 projects laterally beyond yoke 52 and is releasably engaged by hooked end 70 of a latching lever 71 pivoted at a mid-point to bracket 49 and urged clockwise, as seen in FIGURE 9 of the drawing, by a tension spring 72 connected to the trailing end of latching lever 71 and to a stationary point on support frame 26.

The solenoid armature 46 has its upper end pin-connected to latch lever 71 whereby energization of solenoid 44 effects depression of the latching end of lever 71 against the bias of spring 72 to release carriage 50. The leading end of hook member 70 is upwardly rearwardly inclined, as at 73, to define a cam by which the hook is depressed by pin 61 upon rearward movement of carriage 50.

The actuating arm 69 is pivoted at its lower end to a bracket 74 secured to the bottom of the leading leg 27. Urging arm 69 to its advanced counterclockwise position is a weight 76 which is connected by way of a flexible cable 77 and a tension spring 78 to actuating arm 69 at a point above its lower end. Fexible cable 77 passes about a pulley 79 carried on a bracket 80 which is mounted on one of the forward support legs 27. Thus, the energization of solenoid 44, upon actuation of switch 42 by arm 43 in the absence of underlying cigars, depresses the armature 46 to lower latching hook 70 and release pin 61, permitting arm 69 to swing to its advance position under the urging of the weight 76. The carriage is thereby advanced to its forward position and the pusher plate 63 depressed by reason of the clockwise urging of lever 60 by the connection between the trailing end of lever 60 and arm 69. It should be noted that upon retraction of carriage 50 by pulling open the trailing end of lever 60, said lever 60 is rocked clockwise to raise the level of pusher plate 63 above that of the cigars.

The main drive mechanism, as best seen in FIGURES 9 through 15 of the drawings, a single cycle of which is initiated by the forward movement of arm 69, includes a main shaft 81 which is suitably journalled to the forward support legs 27 by means of pillow blocks 82. Freely rotatably on shaft 81 is a pulley 83 which is connected by way of a belt 85 through a suitable speed-reducing unit to a continuously running electric motor. Also freely rotatable on shaft 81 and affixed to pulley 83 is a toothed clutch wheel 84 having longitudinally inclined teeth 86 along the periphery thereof separated by intervening slots 87. A second clutch wheel 88 is affixed to shaft 81 by a set screw 89 registering with a tapped bore formed in the wheel 88. Wheel 88 is adjacent wheel 84 and separated therefrom by an intervening spacer 87'. Coupling between wheels 88 and 84 is effected by a lever 90 pivoted by a pin 92 between the arms of a radially projecting yoke member 91 on wheel 88. The inner end of lever 90 defines a latching dog 94 which is adapted to register with a slot 87 in wheel 84 to effect a coupling between the wheels 88 and 84.

A follower pin 96 is mounted in a bore formed in the outer end of lever 90 and projects above and below the faces thereof, the upper end of pin 96 being rounded as at 97. A compression spring 98 is entrapped between the underface of the outer end of lever 90 and the hub of wheel 88 registering with the lower end of pin 96 and an aligned projection formed on hub 99 thereby to urge lever 90 clockwise, as seen in FIGURE 12 of the drawing, to effect engagement between wheels 84 and 88.

Dog 94 is normally maintained out of engagement with wheel 84 to maintain said wheels 84 and 88 in uncoupled condition by means of an arm 99 pivoted at its lower end to a bracket 100 mounted on a cross-piece or base plate 101 supported and extending between front support legs 27. The upper end of arm 99 is pin-connected by way of a yoke 102 to a push rod 103 which passes through an opening in support leg 27 and terminates in a head element 104. A helical compression spring 106 is entrapped between head 104 and the confronting face of support leg 27 to urge rod 103 and arm 99 to a retracted uncoupling position. Mounted on the front face of arm 99 and in the path of the upper section 97 of pin 96 as it rotates with the wheel 88 is an unlatching or decoupling arm 107 having an inclined cam surface 108 terminating in the forwardly directed stop or abutment 109.

A cylindrical cam 110 is affixed to shaft 81 by a set screw 111 registering with a tapped bore formed in hub 112 of cam 110 and engaging shaft 81. Cam 110 is provided with a helical cam surface 113, the top and bottom of which are connected by a longitudinal drop 114. A cam follower 116 is mounted by means of a yoke at the inner end of a rod 118 which is pin-connected by means of a yoke 119 to actuating arm 69 at a point above the pivoted lower end thereof. The rod 118 slidably registers with the bushing 120 and an aligned opening formed in a support leg 29. The follower 116 is in alignment with cam edge 113 and is urged into engagement therewith upon release of carriage 50 by latch hook 70, which permits the advance of arm 69. It should be noted that when pin 97 is in registry with cam 107 and dog 94 is out of engagement with wheel 84, the follower 116 is in alignment with the lowermost end of cam surface 113. Thus, upon energization of solenoid 44 and depression of armature 46 and latching hook 70, carriage 50 is released and urged by arm 69 and weight 76 to its advance position, follower 116 thereupon being free to move to the bottom of cam surface 113.

As arm 69 advances, it impinges on head 104 of rod 103 swinging arm 99 counterclockwise as seen in FIGURE 9, to release pin 97 so that dog 94 is urged by spring 98 into engagement with wheel 86. Coupling is thereby effected between the wheels 84 and 88, rotating shaft 81 and cam 110. As cam 110 rotates, arm 69 is urged to its retracted position by follower 116 and rod 118 so as to release push rod 103 which is urged to its retracted position 106, swinging arm 99 to its retracted position and cam 107 into the path of pin 97. As wheel 88 rotates, bringing pin 97 into engagement with cam surface 108, dog 94 is disengaged from wheel 84 and wheel 88 is stopped upon pin 97 approaching the abutment 109 to stop shaft 81 after a single revolution. As a consequence, each actuation of switch 42 results in a single cycle of the transfer mechanism and a single rotation of shaft 81 in the above manner.

The mechanism for advancing belt 33 and increment for each rotation of shaft 81 is best seen in FIGURES 5, 9, 16 through 18, and 21 of the drawings, and includes a ratchet wheel 121 affixed to drum shaft 30. Also mounted on drum shaft 30 is a rocker arm 122 which carries a pawl 123 spring biased into engagement with ratchet wheel 121. A rod 124 connects crank arm 126 to rocker arm 122 whereby a single rotation of shaft 81 effects a reciprocation of rocker arm 122 and a forward and return movement of pawl 123 along ratchet wheel 121.

In order to control the stroke of pawl 123 in advancing engagement with ratchet wheel 121, so as to regulate the increment advance of belt 33, there is provided an arcuate shield member 127 which extends for a short distance about the periphery of ratchet wheel 121 trailing the retracted position of pawl 123. Shield 127 is mounted on a plate 128 which rotatably registers with the hub of ratchet wheel 121. A curved arm 129 extends above the leading end run of belt 33 and is pivoted at its lower end to a bracket 130 mounted on a forward support leg 27. The upper end of arm 129 carries a roller 131 which rests on belt 33 at the beginning of its curved end run and is urged thereto by a helical tension spring 132 connected between the lower portion of arm 129 and a stationary member carried by leg 27. A link 133 connects the upper section of arm 129 to a radially projecting lug 134 on plate 128. The angular position of arm 129, and hence the angular position of shield 127 along the periphery of ratchet wheel 121, is controlled by the position of flight 34 relative to roller 131. The more forward the location of the rest position of flight 34 in engagement with roller 131, the greater the forward movement of arm 129 and of shield 127. As pawl 123 is carried to its retracted position, it is disengaged from the ratchet wheel 121 by the leading edge of shield 127. The length of the next successive advancing stroke of pawl 123 in engagement with ratchet wheel 121 is, therefore, determined by the position of the last flight in engagement with the roller 131 automatically to regulate the length of advance of belt 33 to the average of the single increment. The more forward the flight 34 in engagement with roller 31, the smaller the advance of belt 33 on the next stroke, and the more rearward the position of flight 34, the greater the stroke.

Referring now to FIGURES 5 through 8 of the drawings, each feeding device 19 includes a storage hopper 136 located directly above the upper run of belt 33 and being upwardly forwardly inclined. Hopper 136 is completely open along its trailing end and includes an inclined front wall 137, side walls 138 and a bottom wall or base 139 which is forwardly downwardly inclined starting at a point rearwardly of the trailing edges of side walls 138, to provide a trailing platform 140, and terminating at its leading end at a point above the upper run of conveyor 33. The lower edge of the hopper front wall 137 is located above the level of base 139, and has adjustably affixed thereto by means of screws 141 a gate plate 142 which permits adjustment of the discharge opening 143 at the lower forward end of the hopper 136. A pair of laterally spaced, supplementary side walls 144 are separably mounted in any suitable manner by means of posts 146 on the hopper main side walls 138 so as to permit medial alignment of the stacked cigars in the hopper 136, and the adjustment of the width of such stack.

A pusher or discharge member 147 is slidable along the base 139 between a forward position, as illustrated in FIGURE 7 of the drawing, and a retracted position, as shown in broken line in FIGURE 5 of the drawing, and includes a bottom frame member consisting of parallel laterally spaced side bars 148 and a front cross bar 149. A flat sheet or platform 150 is mounted on the frame member and carries upon its trailing border a cross bar 151 projecting laterally beyond the sides of base 150 and terminating in opposite stub pins 152. Formed in the frame cross bar 149 adjacent opposite ends thereof are a pair of slots 153 which support for lateral adjustment corresponding guide members, including forwardly directed arms 154 and laterally extending wings which overlie slots 153 and are adjustably affixed thereto by means of suitable nut-carrying bolts. Arms 154 are adjusted so as to be in substantial coplanar alignment with the hopper side walls 144. The level of the discharge device base plate 150 above the hopper base 139 is such as to raise the upper face of the lowermost layer of cigars to a point above the lower edge of gate 142 when the discharge member 137 is in its advance position. When the discharge member 137 is in its retracted position, the level of the lowermost layer of cigars is below the bottom edge of plate 142 to permit the ejection of such lower layer.

The mechanism for reciprocating the discharge member 147 includes a pair of oppositely disposed arms 158 and 159 respectively. A transverse shaft 160 is suitably journalled to the main support frame by means of pillow blocks 161 affixed to and depending from oppositely disposed channelled shaped brackets 162 secured to the underface of longitudinal channel members 28. The lower end of arm 158 is provided with a hub 163 which is affixed to shaft 160 by means of a pin 164. The lower end of arm 159 is likewise provided with a hub 165 coaxial with shaft 160 but of greater internal diameter so as to provide an annular space 166 between shaft 160 and hub 165, and is affixed to shaft 160 by a pin 167. The upper ends of arms 159 have slots 168 formed therein which engage discharge member pins 152.

Rotatably mounted at a point between its ends on shaft 160 adjacent the lower end of arm 159 is a lever 169, the upper end of which is provided with a transversely bored boss 170 which may be brought into axial alignment with an opening 171 formed in the arm 159. A coupling pin 172 slidably engages bored boss 170, and is provided with a head 173 having a peripheral groove 174 formed therein. Pin 172 is movable to an advance position into engagement with opening 171 to effect coupling between arm 159 and lever 169, and to a retracted position, shown in dotted line in FIGURE 8, out of engagement with opening 171 to decouple arm 159 from lever 169.

The pin head 173 is engaged by the lower end of an arm 176 which registers with groove 174, the upper end of arm 176 being swingably supported by a pin 177 carried by brackets 178 and engaged by the knuckle-carrying upper end of arm 176. A helical compression spring 179 is entrapped between the confronting faces of arm 176 and bracket 162, and retained in position by bosses 180 normally to urge arm 176 counterclockwise and pin 172 towards an advance position and into engagement with opening 171 when in alignment therewith.

In order to selectively disable the operation of discharge member 137, a hand lever 181 is pivotally connected intermediate its ends to a bracket 182 which is affixed to a channel member 28. The lower end of lever 181 is connected by a chain or rod 183 to a lug 184 carried by arm 176. Pivotally mounted by means of a pin 186 on the top face of channel member 28 in the path of the upper end of hand lever 181 is a latching hook 187 which is normally urged to its lock position by a suitable hairpin spring 188. The leading edge 189 of the hooked end of latch member 187 is cammed so that upon swinging lever 181 clockwise, as seen in FIGURE 8 of the drawing, latch member 187 is swung to a retracted unlocked position by lever 181, and as the hooked portion is passed, it is returned by spring 188 to lock position and retains the lever in its retracted position. The lever may be released merely by swinging latching member 187 outwardly to its unlocked position. Under normal operating conditions, pin 172 registers with opening 171 so that arm 159 is coupled to lever 169 by swinging lever 181 clockwise into its advance position, locked by latching member 187, and pin 172 is withdrawn from opening 171 to decouple arm 159 from lever 169.

The lower ends of levers 169 associated with the successive feed devices 19 are each provided with a coupling bracket 190, including a horizontal arm 191 pin-connected at its trailing end to the lower end of the respective lever 169, and having at its forward end a depending block 192 with a longitudinal bore formed therein. A longitudinally extending rod 193 passes through the bores formed in legs 192 and is locked in position by means of set screws 194 registering with the tapped opening communicating with the bores. Immediately forward of each of brackets 190 and affixed to rod 193 is a connecting block 196 which is pin-connected to the lower end of a link 197 pivoted at its upper end to channel member 28. The arms 159, levers 169 and links 197 are so disposed and connected that they form corresponding parallelogram motions having a large radius swing whereby rod 193 reciprocates at substantially a common level with the movement of arms 159 and lever 169 between a retracted and an advanced position.

The forward end of rod 193 is slidably supported by a bracket 198 and carries a cam-follower roller 199. Roller 199 engages the edge of a cam 200 which is affixed to the free and of shaft 81. It should be noted that when shaft 81 is in its rest position, follower 199 engages the raised portion of cam 200 so that rod 193 is in its rearmost position. A helical tension spring 201 has one end thereof connected to a bracket 262 affixed to rod 193 and its other end connected to a suitable stationary abutment forward of bracket 262 to normally urge rod 193 forwardly.

In order to effect activation of the discharge members 137 only upon advance of main conveyor belt 33 a predetermined number of increments, for example six, there is provided an index wheel 203 affixed to a shaft 204 (see FIGURES 5 and 10 of the drawings) which is journalled in a bracket 206 carried by the main support frame. Rod 193 has mounted thereon a block 207 which carries a laterally directed pin 208 urged into bearing engagement with the peripheral surface of wheel 203. A diametrically extending groove 209 is formed in index wheel 203 and is of a slightly greater width than the diameter of pin 208 to permit the sliding of pin 208 along the groove 209 when in horizontal registry therewith.

Also affixed to shaft 204 is a sprocket wheel 210 having 12 teeth formed thereon corresponding to twice the number of increments in a group. A rocker arm 211 is mounted on shaft 204 and carries a pawl member 212 urged by a torsion spring 213 into engagement with sprocket wheel 210. An upwardly directed arm 214 (see FIGURE 9 of the drawing) is pivoted at its lower end to a bracket 216 mounted on shelf 201 and has a vertical slot 217 formed adjacent its upper end. A connecting rod 218 has its trailing end pinned to the pawl-carrying rocker arm 211 and its forward end engages slot 217. Rod 218 and connected arms 211 and 214 are urged to a forward position by a helical tension spring 220 connected between a pin 221 carried by rod 218 and a pin 222 carried by vertical leg 27. Projecting laterally from arm 214 intermediate the ends thereof is a cam follower pin 223 which bears on the peripheral surface of a cam 224 adjustably affixed to shaft 81 by a set screw 226. It should be noted that when shaft 81 is in its rest position, pin 223 rests in the depressed portion of cam 224 and is reciprocated only for its full stroke at the termination of a rotation of shaft 81 and cam 224. Thus, ratchet wheel 210 is advanced a single tooth for each rotation of shaft 81 to rotate index wheel 203 30° so that it requires six revolutions of shaft 81 to bring index wheel groove 209 in alignment with follower pin 208 and permit reciprocation of rod 193 by cam 204 and a consequent actuation of pusher members 147.

In order to bring the cigars carried by belt 33 into alignment at the leading end of the conveyor, there is provided a laterally extending guide plate 227 which is hinged at its upper end to brackets 228. Gate 227 is of sufficient weight to prevent the advance of the individual cigars but may be easily swung by the flights 34 out of the path thereof.

Considering now the operation of the improved apparatus described above, the attendant at each one of the inspection stations loads hopper 136 by means of scoop 20 with a stack of successive layers of cigars C. As switch arm 43 senses the requirement for cigars to packaging machine 12, switch 42 is actuated to energize solenoid 44, depressing armature 46 and latch member 70 and releasing carriage 50. Arm 69 actuated by weight 76 swings to its advance position, pushing carriage 50 and pusher member 63 across belt 33 to transfer a line of cigars to the packaging machine conveyor 36, tripping arm 43 and deactivating switch 42, which permits the return of latch 70 to its locked position. As arm 69 approaches its forwardmost position, it pushes rod 103, swinging lever 99 to move cam 107 out of engagement with pin 96, and spring 98 swings lever 90 and dog 94 into engagement with rotating toothed plate 84. Wheel 88 is thus coupled to wheel 84 to rotate shaft 81 in a single revolution since decoupling is effected by the return of cam 107 to the path of pin 96 in a manner earlier set forth. The rotation of shaft 81 rotates cylindrical cam 110 to swing arm 69 to its retracted position, pulling carriage 50 therewith into locked engagement with latching member 70. The conveyor 33 is advanced a single increment by rotation of crank arm 126 which rocks pawl 123 in engagement with ratchet wheel 121 a distance determined by the position of shield 127 located by the relative position of the leading flight 34, as earlier described.

Index wheel 203 is advanced an increment of 30° during a revolution of shaft 81, and if prior thereto index wheel groove 209 is in alignment with follower pin 223, rod 193 is pulled forwardly by spring 201, swinging levers 169, and is then pushed to its retracted position by cam 200. The reciprocation of rod 193 effects a rocking of lever 169 and arms 158 and 159 to reciprocate discharge member 147 and push the lowermost layer of cigars upon the increment of the conveyor 33 immediately forward of the corresponding hopper 136. Thus, for each advance of conveyor 33 a predetermined number of increments, a layer of cigars is discharged from each of hoppers 136 into an awaiting increment of the conveyor 33, the increment being a different one of the successive groups at each of hoppers 136. Thus, no more than a single layer of cigars are deposited in each increment of the belt 33 and at the terminus of the belt all the increments carry cigars if all hopper discharge members are in activated condition. If, for some reason, an attendant at one of the stations wishes to discontinue the feeding of cigars through the conveyor, he merely disables the operation of the discharge member 136 by swinging hand lever 181 into locked engagement with latched member 187 to decouple lever 169 from arm 159 in the manner earlier set forth.

While there has been described and illustrated a preferred embodiment of the present invention, it is apparent that numerous alterations and omissions may be made without departing from the spirit thereof.

I claim:

1. A conveying system of the character described, comprising a main endless belt conveyor including successive longitudinal groups of a predetermined number of substantially equal increments, means intermittently advancing said conveyor an increment thereof, a plurality of hoppers disposed along said conveyor, the spacing between successive hoppers being a multiple of said increments different than the number of increments in said group and said hoppers concurrently registering with different increments in said respective groups, each of said hoppers including a bin having a front wall and a bottom wall and side walls, said front wall having a transverse opening formed therein directly above said bottom wall, a metering discharge member associated with each of said hoppers and including a plate disposed above and slidable in a plane parallel to said hopper bottom wall between an advanced forward discharge position and a retracted position, and means intermittently concurrently actuating said discharge member upon advance of said conveyor a group of increments.

2. A conveying system in accordance with claim 1, wherein said bin front wall is upwardly forwardly inclined.

3. A conveying system in accordance with claim 1, wherein said bin bottom wall is forwardly downwardly inclined.

4. A conveying system of the character described, comprising a main endless belt conveyor including successive longitudinal groups of a predetermined number of substantially equal increments, longitudinally separated transverse flights mounted on said conveyor and delineating said successive increments, means intermittently advancing said conveyor an increments thereof, a plurality of hoppers disposed along said conveyor, the spacing between successive hoppers being a multiple of said increments different than the number of increments in said group and said hoppers concurrently registering with different increments in said respective groups, a metering discharge member associated with each of said hoppers, and means intermittently concurrently actuating said discharge member upon advance of said conveyor a group of increments.

References Cited in the file of this patent

UNITED STATES PATENTS

| | | |
|---|---|---|
| 2,415,941 | Edson | Feb. 18, 1947 |
| 2,585,829 | Perkins | Feb. 12, 1952 |
| 2,603,340 | Warren et al. | July 15, 1952 |
| 2,822,910 | Wachsmuth | Feb. 11, 1958 |
| 2,823,787 | Morgan | Feb. 18, 1958 |
| 2,847,113 | Dumas | Aug. 12, 1958 |
| 2,934,195 | Bishop et al. | Apr. 26, 1960 |